(12) United States Patent
Waltermann et al.

(10) Patent No.: US 11,048,736 B2
(45) Date of Patent: Jun. 29, 2021

(54) FILTERING SEARCH RESULTS USING SMART TAGS

(71) Applicant: Lenovo (Singapore) Pte. Ltd., Singapore (SG)

(72) Inventors: Rod D. Waltermann, Rougemont, NC (US); Russell Speight VanBlon, Raleigh, NC (US); Suzanne Marion Beaumont, Wake Forest, NC (US); Jonathan Gaither Knox, Morrisville, NC (US); Peter Hamilton Wetsel, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1012 days.

(21) Appl. No.: 14/098,155

(22) Filed: Dec. 5, 2013

(65) Prior Publication Data

US 2015/0161206 A1 Jun. 11, 2015

(51) Int. Cl.
*G06F 16/33* (2019.01)
*G06F 16/48* (2019.01)
*G06F 16/907* (2019.01)
*G06F 16/58* (2019.01)
*G06F 16/9535* (2019.01)

(52) U.S. Cl.
CPC .......... *G06F 16/3334* (2019.01); *G06F 16/48* (2019.01); *G06F 16/5866* (2019.01); *G06F 16/907* (2019.01); *G06F 16/9535* (2019.01)

(58) Field of Classification Search
CPC ............. G06F 17/218; G06F 17/30038; G06F 17/30268; G06F 17/30752; G06F 17/3082; G06F 17/30106; G06F 17/30864; G06F 17/30663; G06F 17/30867; G06F 17/30997; G06F 16/3334; G06F 16/907; G06F 16/5866; G06F 16/9535; G06F 16/48
USPC ........................................................ 707/722
See application file for complete search history.

(56) References Cited

U.S. PATENT DOCUMENTS

| | | | | |
|---|---|---|---|---|
| 8,200,669 | B1* | 6/2012 | Iampietro | G06F 17/30784 707/737 |
| 8,209,320 | B2* | 6/2012 | Reitter | G06F 17/30964 707/709 |
| 2004/0230636 | A1* | 11/2004 | Masuoka | G06F 9/4443 708/800 |
| 2005/0138109 | A1* | 6/2005 | Redlich | G06F 17/30699 709/201 |
| 2006/0074980 | A1* | 4/2006 | Sarkar | G06F 17/3089 |
| 2006/0271520 | A1* | 11/2006 | Ragan | G06F 17/30663 |
| 2007/0038610 | A1* | 2/2007 | Omoigui | G06F 17/3089 |
| 2007/0078832 | A1* | 4/2007 | Ott, IV | G06F 17/30867 |

(Continued)

*Primary Examiner* — Hosain T Alam
*Assistant Examiner* — Saba Ahmed
(74) *Attorney, Agent, or Firm* — Ference & Associates LLC

(57) ABSTRACT

An aspect provides a method, including: receiving from a user, at an input device of an information handling device, user object search input including at least one search term; accessing, using a processor, tag information of a plurality of tags associated with stored user objects; determining, using a processor, at least one modification to the user object search input to change results produced by the user object search input based on the tag information; and providing search results according to the at least one modification. Other aspects are described and claimed.

16 Claims, 3 Drawing Sheets

(56) References Cited

U.S. PATENT DOCUMENTS

| | | | |
|---|---|---|---|
| 2007/0168335 A1* | 7/2007 | Moore et al. | 707/3 |
| 2007/0288514 A1* | 12/2007 | Reitter et al. | 707/104.1 |
| 2009/0171898 A1* | 7/2009 | Prager | G06F 17/30864 |
| 2009/0216805 A1* | 8/2009 | Coffman | G06F 17/30038 |
| 2009/0217254 A1* | 8/2009 | Shneerson | G06F 3/0481 |
| | | | 717/168 |
| 2010/0010968 A1* | 1/2010 | Redlich | G06F 17/30672 |
| | | | 707/E17.014 |
| 2010/0077300 A1* | 3/2010 | Dugan | G06F 17/30884 |
| | | | 715/273 |
| 2010/0311394 A1* | 12/2010 | Pomerantz et al. | 455/414.1 |
| 2012/0166180 A1* | 6/2012 | Au | G06F 17/274 |
| | | | 704/9 |
| 2013/0013638 A1* | 1/2013 | Paulisch | G06F 17/30554 |
| | | | 707/770 |
| 2013/0314214 A1* | 11/2013 | Leica | H04W 4/008 |
| | | | 340/10.1 |
| 2014/0372455 A1* | 12/2014 | Locker et al. | 707/750 |
| 2014/0372467 A1 | 12/2014 | Locker et al. | |

\* cited by examiner

FILTERING SEARCH RESULTS USING SMART TAGS

BACKGROUND

Information handling devices ("devices") come in a variety of forms, for example laptop computing devices, tablet computing devices, smart phones, e-readers, MP3 players, and the like. Such devices are configured for media consumption and users typically store "files", e.g., music, videos, pictures, documents, etc. (hereinafter simply "objects" or "user objects") on the devices.

For example, a typical device user may have thousands and thousands of objects (files, pictures, content, etc.) scattered across his or her device. To compound this, with the advent of cloud computing and remote storage, a user may have objects scattered across many devices (e.g., laptop, tablet, smart phone, work station, etc.) and in cloud storage device(s). The user might remember some things about an object he or she wishes to retrieve, but the user nevertheless often may find it difficult to find it quickly. For example, many devices create media file names that are less than helpful (e.g., a number corresponding to a digital image captured by a smart phone and stored on the smart phone locally and in a cloud or other network connected device). Even if the user has chosen a memorable file name or storage folder, object retrieval can prove challenging in the current use environment where typically the objects are scattered throughout the device and/or devices and not well organized from a retrieval standpoint.

BRIEF SUMMARY

In summary, one aspect provides a method, comprising: receiving from a user, at an input device of an information handling device, user object search input including at least one search term; accessing, using a processor, tag information of a plurality of tags associated with stored user objects; determining, using a processor, at least one modification to the user object search input to change results produced by the user object search input based on the tag information; and providing search results according to the at least one modification.

Another aspect provides an information handling device, comprising: a user input device; a processor; a memory device that stores instructions accessible to the processor, the instructions being executable by the processor to: receive user object search input including at least one search term; access tag information of a plurality of tags associated with stored user objects; determine at least one modification to the user object search input to change results produced by the user object search input based on the tag information; and provide search results according to the at least one modification.

A further aspect provides a product, comprising: a storage device having code stored therewith, the code comprising: code that receives from a user, at an input device of an information handling device, user object search input including at least one search term; code that accesses, using a processor, tag information of a plurality of tags associated with stored user objects; code that determines, using a processor, at least one modification to the user object search input to change results produced by the user object search input based on the tag information; and code that provides search results according to the at least one modification.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
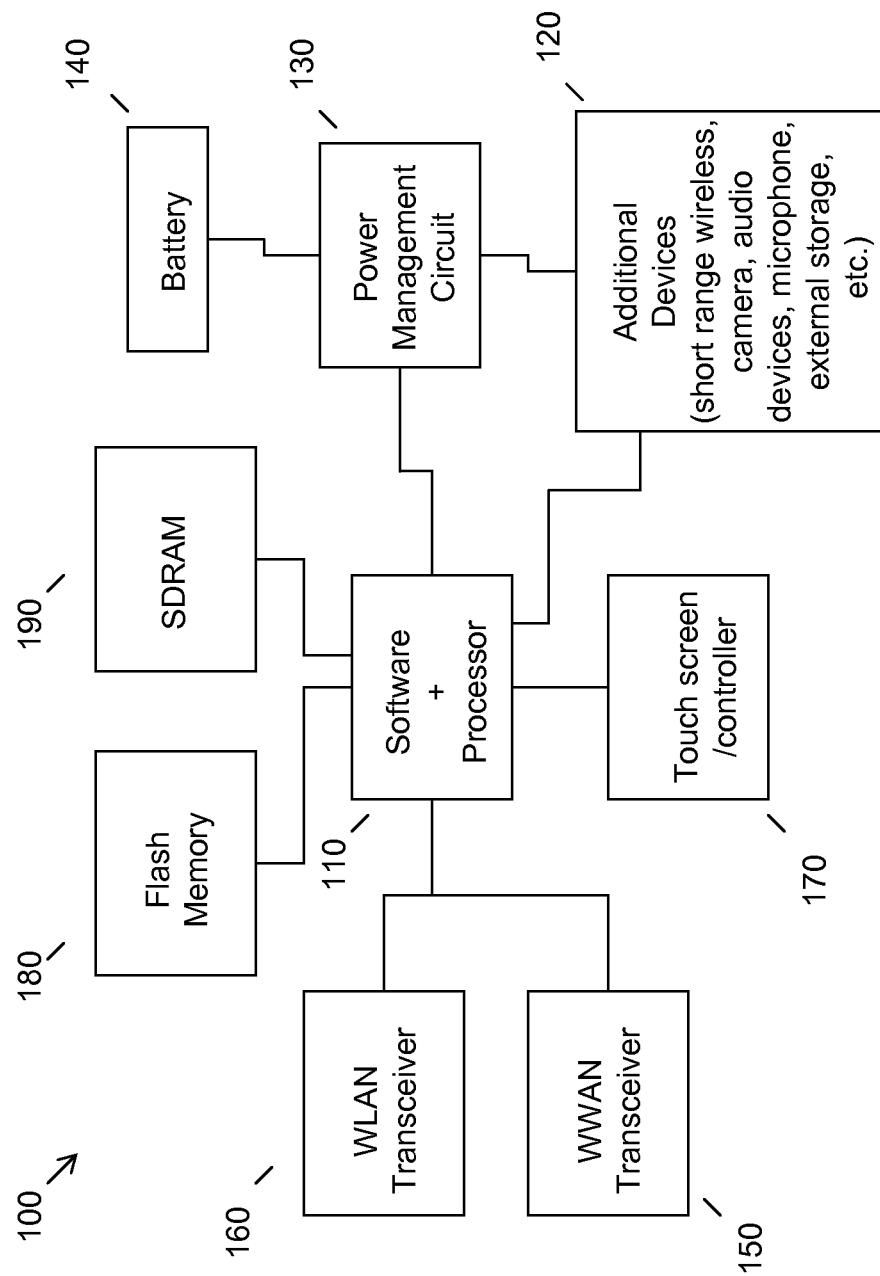
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As described in further detail herein, a user is often faced with a serious challenge when attempting to find an object he or she wants, and it is often doubly challenging to find the object quickly. Such a user would benefit greatly from a retrieval mechanism that operates on the principle of tagging objects with data regarding "some thing(s) you will remember a year or more later".

Today users are limited in their object retrieval choices. For instance, users are basically limited to only searching by file name and/or date that file was modified, and/or information inside the file for some type of files (e.g., words contained within a Microsoft WORD document). Unfortunately, from a usability stand point, this is either entirely ineffective (e.g., file name on a video file is a machine generated number) or simply frustrating, as this is not the way our minds work to remember clues about the object (and that are not necessarily in the object), especially if it is a non-data object (picture, video, etc.).

Accordingly, an embodiment provides the ability to use smart tags for retrieval of user generated objects (e.g., pictures, documents, files, etc.) that are stored on the user's device(s). Some useful information regarding smart tags is found in co-pending and commonly assigned U.S. patent application Ser. No. 13/919,293, entitled "SMART TAGS FOR CONTENT RETRIEVAL", filed on Jun. 17, 2013 and in co-pending and commonly assigned U.S. patent application Ser. No. 13/919,376, entitled "CONTEXTUAL SMART TAGS FOR CONTENT RETRIEVAL", filed on Jun. 17, 2013; the contents of each of these prior applications are incorporated by reference in their entirety herein.

An embodiment permits, for example, generation of a smart tag describing an object (e.g., a picture file, a document, etc.) created by a user and stored on one of the user's devices. Thus, a user creating a picture file by taking a picture may have a smart tag created and associated therewith and stored in a tag collection, e.g., on the user device and/or in a remote or cloud storage device. The tag may contain metadata, e.g., user provided metadata such as audio for generating key words describing the picture file, and/or system originated data, e.g., from one or more sensors, such as global positioning data regarding the location the picture was taken, data indicating an association of such position with nearby businesses or landmarks as for example available in map data, sensed user devices in the location of the user device utilized to take the picture, e.g., smart phones of friends or family members in the vicinity, etc., data from sensors or other information repositories regarding the environment, e.g., temperature, weather events, ambient light, timing data, etc.

Given the ability to generate such smart tags, a user may be assisted in a search for an object via leveraging the smart tag data in the search. For example, if a user happens to be taking pictures of a friend at a particular occasion, e.g., Bob's 50th birthday party, the user could simply say "Bob's 50th birthday party" to provide speech input for creating a smart tag for the object to be created, i.e., the picture. This information is then processed (e.g., converted using a speech-to-text mechanism) and stored as a separate tag or tags with a link/naming convention linking it to the object (picture). The user may then later retrieve the object, i.e., the picture in this example, simply by inputting a search such as "the picture I took at the birthday party last week" and searching the smart tags for this object.

Smart tags may be generated for the entire content universe of a user (e.g., creating smart tag(s) including all key words contained within a word processing document, for all such word processing documents of the user, as well as smart tags regarding location of document creation, modification, and other contextually based smart tags, etc.). While these numerous smart tags offer a rich data background that may be used to located the user's object(s), filtering the results produced via utilizing such smart tags should be intelligently employed such that object search results provided to a user take on a useful form.

Currently a user is limited in filtering object search results by modifying the search conducted. For example, a user can manually modify an existing object search query by adding or removing search terms, modifying operators, modifying time parameters, and/or modifying the locations searched. All of these modifications are manual and none of these searches utilized smart tags or related information.

Accordingly, an embodiment provides for filtering, e.g., broadening and/or narrowing, object search results. For example, when object search results are presented to the user, terms are identified and the user is presented with one or more alternate search results based on, e.g., user selection of a term. The alternate search results may be marked, e.g., visually, so the user knows what type of results each alternate search will give them. Other alternate search results may be presented. For example, alternate search results may be provided and categorized for presentation to the user based on relating the search terms used with different operators, e.g., "and" versus "or" for each search term. In various embodiments, user input may be accepted to modify the search results/alternate searches performed, e.g., modification of the priority or weighting afforded to search terms.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally devices 120 are commonly included. System 100 often includes a touch screen 170 for data input and display/rendering. System 100 also typically includes various memory devices, for example flash memory 180 and SDRAM 190.

Figure 2:
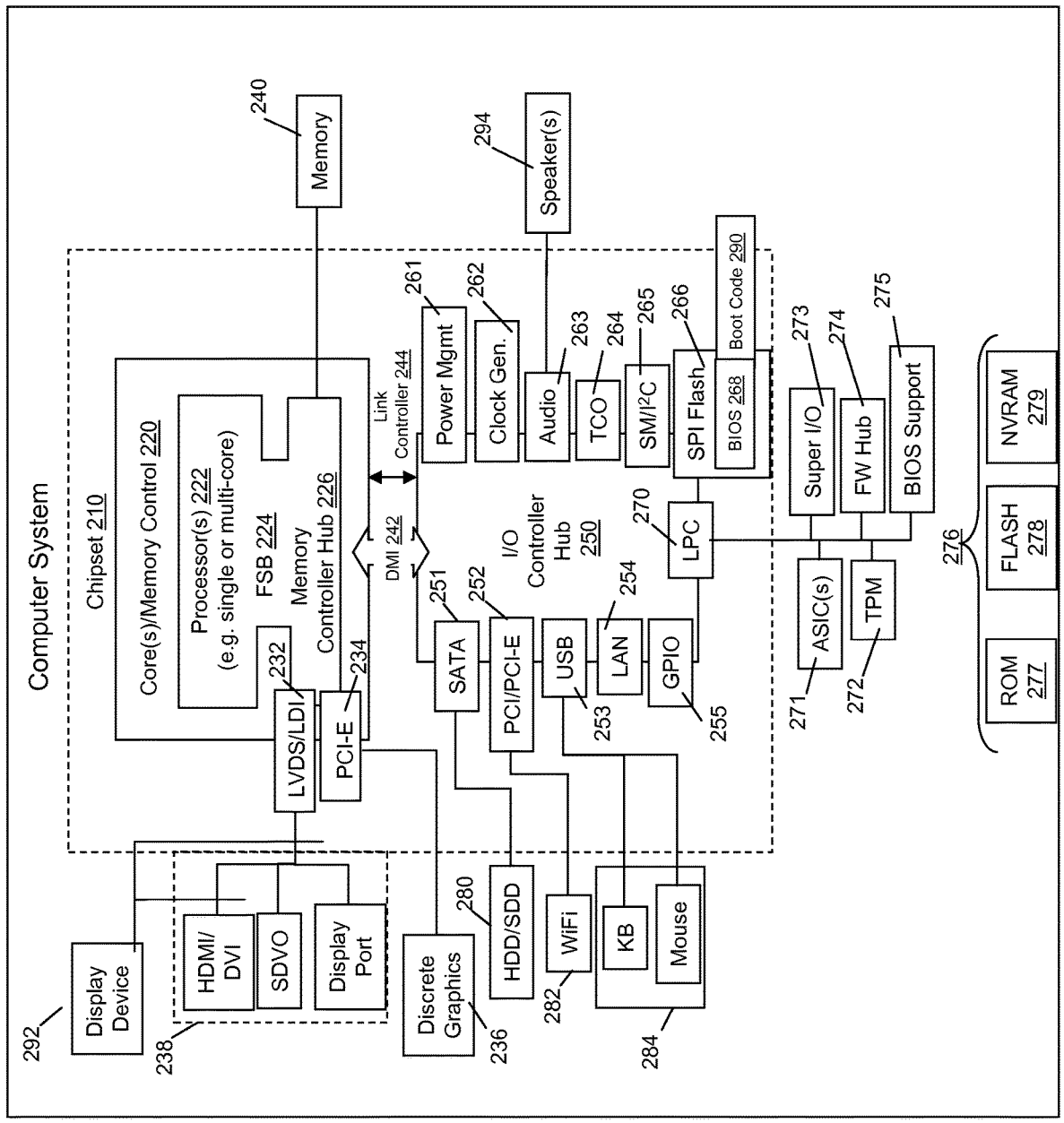
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be user devices that are used to create and/or store objects, e.g., data or files created by the user. For example, devices including circuitry outlined in the example of FIG. 1 may include a smart phone with which a user takes pictures, takes videos, purchases and downloads music files, sends emails, texts, etc. Each of these data objects or files (simply referred to herein as "objects" or "user objects") may be stored by the user, e.g., on the device, in the cloud, on multiple user devices, etc.

As outlined above, a user will often face a significant challenge when he or she later attempts to find a particular object of interest. Accordingly, an embodiment provides mechanisms to filter search results using smart tags and relationships between the smart tags, e.g., as represented by information derived from a tag infrastructure. For example, the tag infrastructure may provide information relating two or more smart tag categories, e.g., as known equivalents, as having a tree-like structure relationship (e.g., parent/child relationship) forming sub-categories, etc.

Figure 3:
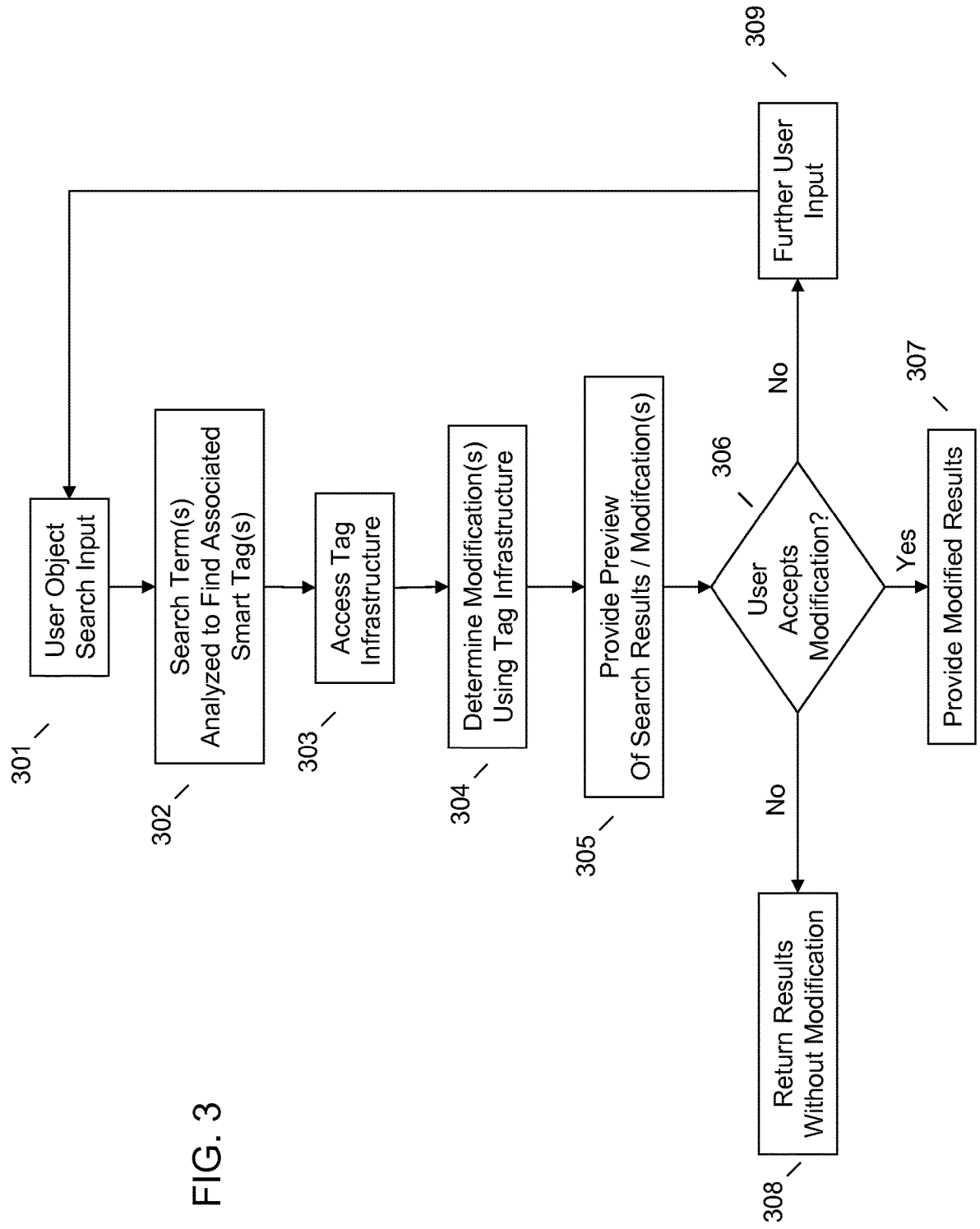
FIG. 3 illustrates an example method of filtering search results.

Referring to FIG. 3, when a user inputs a user object search at 301, e.g., using a voice search such as "find the word processing document I worked on last week at Restaurant A", this input will be parsed to associate the search terms with smart tag categories as well as command(s) at 302.

For example, the search term "find" may be associated with a command action, e.g., search. The search terms "word processing document" may be associated with the smart tag category "word processing documents" such that user objects of that type (and thus having smart tag(s) indicating as much) are searched. Similarly, the search terms "last week" may be associated with a smart tag category of time, wherein the time parameter of the associated smart tag indicates a modification or creation time of no more than a week ago. Likewise, the search terms "worked on" may be associated with the smart tag category "edited". In this example search input, the search term "Restaurant A" may be associated with a restaurant smart tag category.

Having the initial smart tag categories associated with the search terms identified or determined at 302, an embodiment may then conduct the search without further delay (e.g., skipping to step 308). That is, searching for user objects having the smart tags associated at 302 may be conducted to produce initial search results. This will give the user a first pass at search results, which may be included as part of a preview presented at 305, as further described herein.

Additionally or in the alternative, an embodiment may filter the search results based on tag infrastructure information, as follows. By way of example, continuing with the search input of ""find the word processing document I worked on last week at Restaurant A", an embodiment may access a tag infrastructure to derive information that may be used to broaden or narrow the search results.

For the example user search input, in the case of broadening the search results, an embodiment may determine that the tag infrastructure, which may be specific to a user or group of users, is organized such that the smart tag category "restaurant" is a sub-category of businesses. That is, Restaurant A is included in one of the sub-categories, i.e., restaurants, but would also be returned in the broader list of businesses if that smart tag category were used. Therefore, an embodiment may determine a modification for broadening the search results at 304 based on this relationship between smart tag categories represented in the tag infrastructure. Accordingly, an embodiment may provide a preview of search results that would be produced when the parent category businesses is used rather than the sub-category of restaurants. This may be provided in a preview to the user at 305.

The user may appreciate this broadening of the search results, e.g., in the case where the user thought that he or she modified the document at Restaurant A, but actually did the modification at a coffee shop after eating at Restaurant A. Thus, the actual word processing document sought may not have a restaurant smart tag but may include a business smart tag. This is determined by an embodiment, e.g., recognizing the user objects matching other search parameters (e.g., word processing documents edited within one week) are included in a related smart tag category.

Additionally or in the alternative, an embodiment may broaden or narrow search results based on a time parameter. For example, an embodiment may not assume that the user is accurate when they search for an object, e.g., edited, "A week ago". An embodiment may add an error buffer that compensates for weekends and in general peoples' unreliable memories. Thus, an embodiment may start a search with "a week", but then expand out to a wider search. So for example, the "A week ago" may be expanded to 9 or 10 calendar days instead of 7 calendar days.

Given the preview provided at 305, a user may accept or reject the modification to the search. A user may, for example, see the word processing document file name listed in the preview provided at 305 and choose to accept the modification at 306, thereby producing the modified search results at 307 and locating the user object sought. Otherwise, the user may not accept the modification, e.g., complete the original search at 308 and/or provide further refining input at 309, e.g., supplying a modified search term, selecting a particular smart tag category included in the preview at 305, etc.

In the case of narrowing the search results of the example user input, an embodiment may determine that the tag infrastructure is organized such that the smart tag category "edited" includes the sub-categories of "modified" and "created". Thus, an embodiment may determine that within the modified smart tags, three documents were edited at Restaurant A, but only one was created. Therefore, an embodiment may determine at 304 a narrowing suggestion for narrowing down the search results by searching only the sub-category of "created". This may again be provided as an indication of the modified search results that would be produced by using this modification at 305 for user approval, disapproval or modification at 306.

When search results are presented to the user, e.g., in the form of a preview at 305 or otherwise, e.g., after presenting unmodified results at 308 and/or after presenting modified results at 307, the term(s) and/or smart tag categories actually used or suggested to be used may be identified. Thus, the user may be presented with one or more alternate searches by selecting a term or smart tag category for inclusion in a modification. As described herein, this also may take place during a preview at 305. The alternate searches may be marked visually so the user knows what each alternate search will give them.

Additional information may be derived from the tag infrastructure information over and above parent-child relationships between smart tags/smart tag categories. For example, an embodiment may determine at 304 that a modification should include changing the operator(s) input by the user in the search input (or implicitly inferred therefrom) to be more inclusive or more exclusive in terms of user objects identified. For example, search terms may be categorized and thus results presented to the user with "and" versus "or", e.g., for each search term. The operators may be explicit or implicit in the user object search input.

Search terms, phrases, or combined terms may be presented to the user in a list to quickly change the search terms themselves and/or modify the priority or weighting of the search terms. For example, an embodiment may determine equivalent search terms to be utilized based on relationships derived from the tag infrastructure, e.g., another smart tag category known to be equivalent to the smart tag category explicitly invoked by the search may be included in the search or suggested for inclusion in the search. This may be useful for example in the case where the original smart tag category contains no user objects matching the other search terms but an equivalent category does. Likewise, higher priority search terms (and/or smart tag categories) may be used to modify the importance of related results, e.g., affect the ranking of the search results presented to the user.

Before changing a query, an embodiment may present information to show the user how the query modification will affect results, e.g., as illustrated at 305. For example, an embodiment may show or indicate to the user a new result count, the change in result count, the first few results produced by making the change, etc. The user would thus know the impact of the query change before making the change to help them broaden or narrow results.

User preferences may be used to narrow or broaden the smart tag categories, terms, and/or operators used/included in the search, e.g., by accessing a tagging profile of the user indicating smart tags and/or smart tag categories that the user has been or is likely to be interested in, for example based on past use or association with a group of users having smart tag usage histories. User preference may be determined using not only the search terms but also the smart tags/smart tag categories the user is interested in and/or forensic data.

The user is therefore presented with a quick way to add or modify search parameters to quickly narrow/broaden the search for a user object stored on one of the user's devices and/or in a cloud account storage location. An embodiment accomplishes this by accessing tag infrastructure information to determine modifications to the search input, i.e., that may be suggested to the user. This includes modifying search terms, modifying smart tag categories invoked by the search terms, including missing parameters, e.g., search terms, and modification of operators.

An embodiment also allows a user to retain control over the process. For example, an embodiment may provide a preview prior to committing a modification, e.g., for user approval. Likewise, an embodiment may allow a user to refine the modification made after seeing the results of the modification, e.g., by removing a previous modification, including an additional modification, etc.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at the user device, user specific object retrieval search input, wherein the user specific object retrieval search input comprises speech data comprising at least one search term;
   parsing the user specific object retrieval search input to associate the at least one search term with at least one smart tag, wherein the at least one smart tag is associated with a smart tag category;
   conducting, based on the parsing, a search for user objects associated with the at least one smart tag to produce initial search results;
   filtering, by accessing a tag infrastructure comprising a relationship between the smart tag category and at least one other smart tag category, the initial search results to derive at least one modification to the initial search results, wherein the at least one modification changes results produced by the user specific object retrieval search input based on using the at least one other smart tag category; and
   providing a preview of the modified search results to the user.

2. The method of claim 1, further comprising:
   providing an indication of the at least one modification to the initial search results; and
   awaiting a further user input prior to providing user specific object search results according to the at least one modification.

3. The method of claim 1, wherein the at least one modification to the initial search results comprises:
   using a different tag associated with a search term to locate user specific objects;
   wherein the different tag is contextually associated with an initial tag associated with the at least one search term.

4. The method of claim 1, wherein:
   the user specific object search retrieval input comprises two or more search terms relating to contextual information joined by an operator; and
   the at least one modification to the initial search results comprises changing an operator joining two search terms based on information derived from the tag associated with modification of the user specific object.

5. The method of claim 4, wherein the information derived from the tag associated with modification of the user specific object comprises relationship information relating tags associated with the two search terms relating to the contextual information joined by the operator.

6. The method of claim 1, wherein the user specific object search results according to the at least one modification comprise user specific object search results selected from the group of search results consisting of: user specific object search results that are broader than results produced by unmodified user specific object retrieval search input, and user specific object search results that are narrower than results produced by unmodified user specific object retrieval search input.

7. The method of claim 1, wherein the filtering the initial search results to derive at least one modification to the initial search results further comprises predicting an interest of the user.

8. The method of claim 7, wherein the predicting is based on a tagging profile associated with the user.

9. An information handling device, comprising:
   a user input device;
   a processor;
   a memory device that stores instructions accessible to the processor, the instructions being executable by the processor to:
   receive user specific object retrieval search input, wherein the user specific object retrieval search input comprises speech data comprising at least one search term;
   parse the user specific object retrieval search input to associate the at least one search term with at least one smart tag, wherein the at least one smart tag is associated with a smart tag category;
   conduct, based on the parsing, a search for user objects associated with the at least one smart tag to produce initial search results;
   filter, by accessing a tag infrastructure comprising a relationship between the smart tag category and at least one other smart tag category, the initial search results to derive at least one modification to the initial search results, wherein the at least one modification changes results produced by the user specific object retrieval search input based on using the at least one other smart tag category; and provide a preview of the modified search results to the user.

10. The information handling device of claim 9, wherein the instructions are further executable by the processor to:

provide an indication of the at least one modification; and await a further user input prior to providing user specific object search results according to the at least one modification.

11. The information handling device of claim 9, wherein the at least one modification to the initial search results comprises:

using a different tag associated with a search term to locate user specific objects;

wherein the different tag is contextually associated with an initial tag associated with the at least one search term.

12. The information handling device of claim 9, wherein:

the user specific object search retrieval input comprises two or more search terms relating to contextual information joined by an operator; and the at least one modification to the initial search results comprises changing an operator joining two search terms based on information derived from the tag associated with modification of the user specific object.

13. The information handling device of claim 12, wherein the information derived from the tag associated with modification of the user specific object comprises relationship information relating tags associated with the two search terms relating to the contextual information joined by the operator.

14. The information handling device of claim 9, wherein the user specific object search results according to the at least one modification comprise user specific object search results selected from the group of search results consisting of: user specific object search results that are broader than user specific object results produced by unmodified user specific object retrieval search input, and user specific search results that are narrower than results produced by unmodified user specific object retrieval search input.

15. The information handling device of claim 9, wherein the instructions executable by the processor to filter the initial search results to derive at least one modification to the initial search results comprises predicting an interest of the user.

16. A product, comprising:

a storage device having code stored therewith, the code being executable by a processor and comprising:

code that receives from an input device of an information handling device user specific object retrieval search input, wherein the user specific object retrieval search input comprises speech data comprising at least one search term;

code that parses the user specific objet retrieval search input to associate the at least one search term with at least one smart tag, wherein the at least one smart tag is associated with a smart tag category;

code that conducts, based on the parsing, a search for user objects associated with the at least one smart tag to produce initial search results;

code that filters, by accessing a tag infrastructure comprising a relationship between the smart tag category and at least one other smart tag category, the initial search results to derive at least one modification to the initial search results, wherein the at least one modification changes results produced by the user specific object retrieval search input based on using the at least one other smart tag category; and code that provides a preview of the modified search results to the user.

* * * * *